United States Patent
Toksoz

(10) Patent No.: US 10,645,157 B2
(45) Date of Patent: May 5, 2020

(54) CONTENT SYNCHRONIZATION USING PROFILES

(71) Applicant: Google LLC, Mountain View, CA (US)

(72) Inventor: Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 197 days.

(21) Appl. No.: 14/231,627

(22) Filed: Mar. 31, 2014

(65) Prior Publication Data

US 2015/0281350 A1 Oct. 1, 2015

(51) Int. Cl.
*G06F 16/10* (2019.01)
*H04L 29/08* (2006.01)

(52) U.S. Cl.
CPC ............................... *H04L 67/1095* (2013.01)

(58) Field of Classification Search
CPC .................................................. H04L 67/1095
USPC ......................................................... 709/248
See application file for complete search history.

(56) References Cited

U.S. PATENT DOCUMENTS

| | | | |
|---|---|---|---|
| 7,725,584 B1 | 5/2010 | Hanmann et al. | |
| 8,117,162 B2 | 2/2012 | Haselton et al. | |
| 2005/0289342 A1 | 12/2005 | Needham et al. | |
| 2006/0112427 A1* | 5/2006 | Shahbazi | G06F 21/50 726/16 |
| 2008/0049714 A1* | 2/2008 | Commarford | H04L 67/1095 370/350 |
| 2008/0109561 A1* | 5/2008 | Van Gassel | G06F 17/30581 709/248 |
| 2008/0168526 A1 | 7/2008 | Robbin et al. | |
| 2011/0246950 A1 | 10/2011 | Luna et al. | |
| 2011/0289050 A1 | 11/2011 | McCarthy et al. | |
| 2012/0004015 A1* | 1/2012 | Le Thierry D'Ennequin | H04M 1/274516 455/566 |
| 2013/0254897 A1* | 9/2013 | Reedy | G06F 21/10 726/26 |

(Continued)

FOREIGN PATENT DOCUMENTS

| | | |
|---|---|---|
| EP | 2819376 A1 | 12/2014 |
| WO | 2013127449 A1 | 9/2013 |
| WO | 2013139098 A1 | 9/2013 |

OTHER PUBLICATIONS

Notification of Transmittal of the International Search Report and The Written Opinion of the International Search Authority, or the Declaration, 11 pages.

(Continued)

*Primary Examiner* — Vivek Srivastava
*Assistant Examiner* — Sibte H Bukhari
(74) *Attorney, Agent, or Firm* — McDonnell Boehnen Hulbert and Berghoff LLP

(57) ABSTRACT

A method of selective file synchronization between computing devices is disclosed. Creation of customized profiles for grouping digital content, such as application programs and multimedia files, and assignment of the content to the profiles is described. Digital content can be manually or automatically assigned to profiles. Customizable file synchronization profiles provide improved data security because private files can be excluded from a profile and will not be transferred. The disclosed subject matter is applicable to general purpose and special purpose computing devices in mobile and non-mobile environments.

19 Claims, 2 Drawing Sheets

(56) References Cited

U.S. PATENT DOCUMENTS

2015/0082024 A1* 3/2015 Smith ................. H04L 63/0428
　　　　　　　　　　　　　　　　　　　713/155

OTHER PUBLICATIONS

IPRP dated Oct. 4, 2016 as received in Application No. PCT/US2015/022752.

* cited by examiner

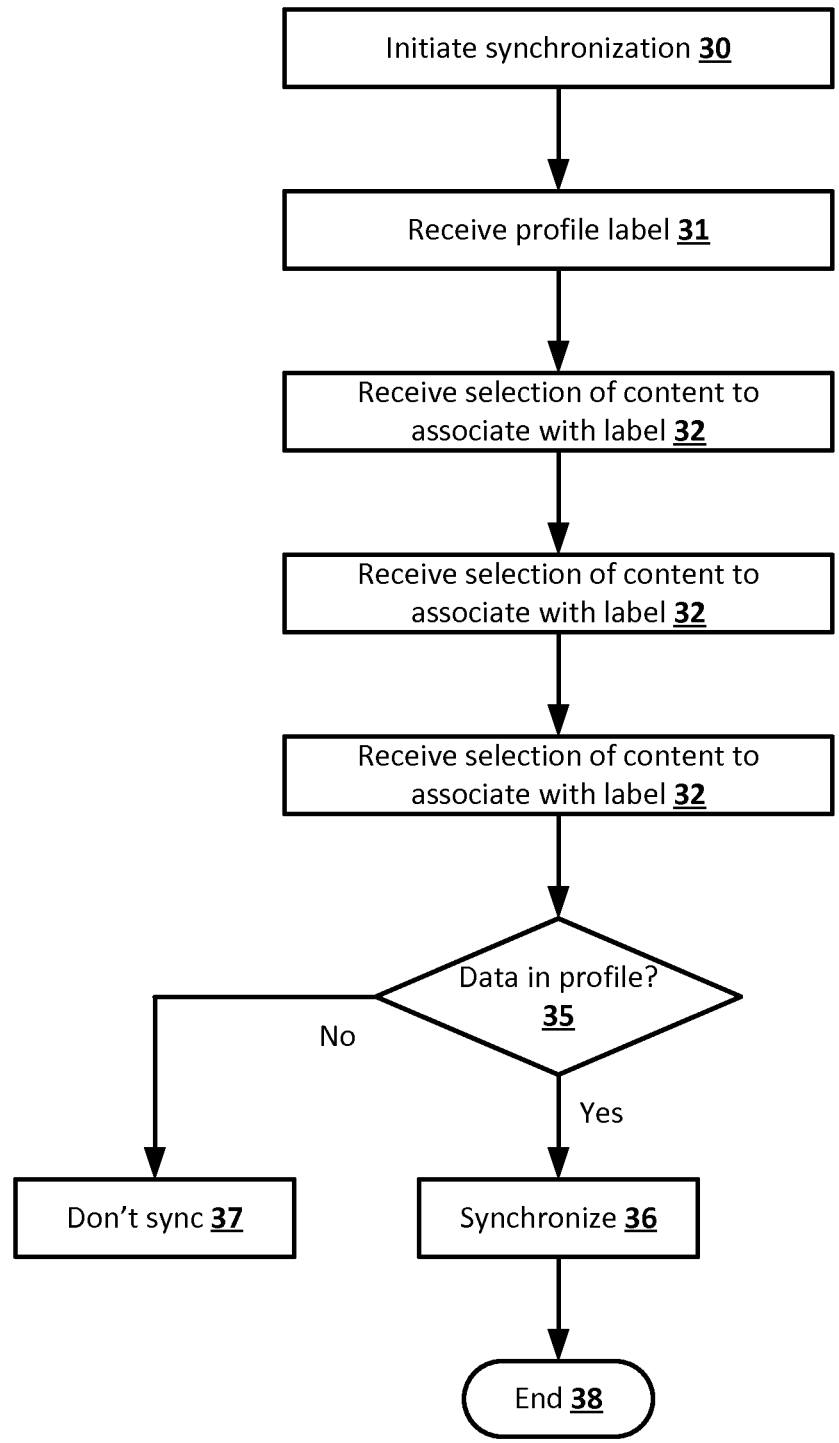

CONTENT SYNCHRONIZATION USING PROFILES

BACKGROUND

In a computing environment, digital content synchronization (also "sync" or "syncing") describes a process of downloading and uploading computer files between two computer systems, for example between client and server computers, to install, update and manage files. A server is typically partitioned into various client accounts, one for each client hosted on that server. A client account on a server becomes synchronized when the client account contains an updated complete or partial mirror image of the digital content of the client. Synchronization can also include downloading digital content (e.g. music files) from a server to the client.

Synchronization on Internet-based client-server systems, known as "cloud-computing" systems or "cloud-based" systems, permits digital content synchronization for client devices and synchronization software is available for commonly used operating systems. Existing systems allow for various levels of complete and partial digital content synchronization. For example, some mobile device backup software provides limited partial data synchronization capability on local or networked computer systems, such as where mobile device synchronization systems allow only applications or only media files to be synchronized.

BRIEF SUMMARY

According to an embodiment of the disclosed subject matter, a method of selective synchronization is disclosed that includes receiving, from a user a first label to assign to a first portion of data stored on a first device. The label indicating a first context in which the first portion of data is to be synchronized. The method also may include receiving a request to synchronize the first device with a second device, and determining a second context in which the request is received. It then may be determined that the second context selected is consistent with the first context, and a synchronization operation may be performed to synchronize the first portion of data with the second device if the contexts match.

A second label for a second portion of data stored on a first device may also be received with the second label indicating a third context in which the second portion of data is to be synchronized. The second label may prohibit synchronization in the third context, and a determination that the second context is consistent with the third context may result in omitting the second portion of data from the synchronization operation.

The first portion of data stored on the first device may include software programs, software applications, multimedia content, text, and a portion of data internal to an application. Also, the synchronization operation includes transferring a copy of the first portion of data from the first device to the second device.

A user interface to facilitate user interaction with the data synchronization operation may also be provided, that allows displaying of the label, and the portion of data assigned to the label. Example labels include sync, don't sync, private, personal, public, non-private, travel, music, movies, photos, documents, financial, games.

The computing devices may include a cellular phone, a smartphone, a tablet computer, a personal digital assistant, a digital music player, a wearable device, a laptop device, a Personal Computer (PC), a desktop computer, a networked server, a vehicle entertainment system, a global positioning system, and an in-flight entertainment system.

Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows the method of preparing and using a user-defined set of profiles according to an embodiment of the disclosed subject matter.

DETAILED DESCRIPTION

Figure 1:
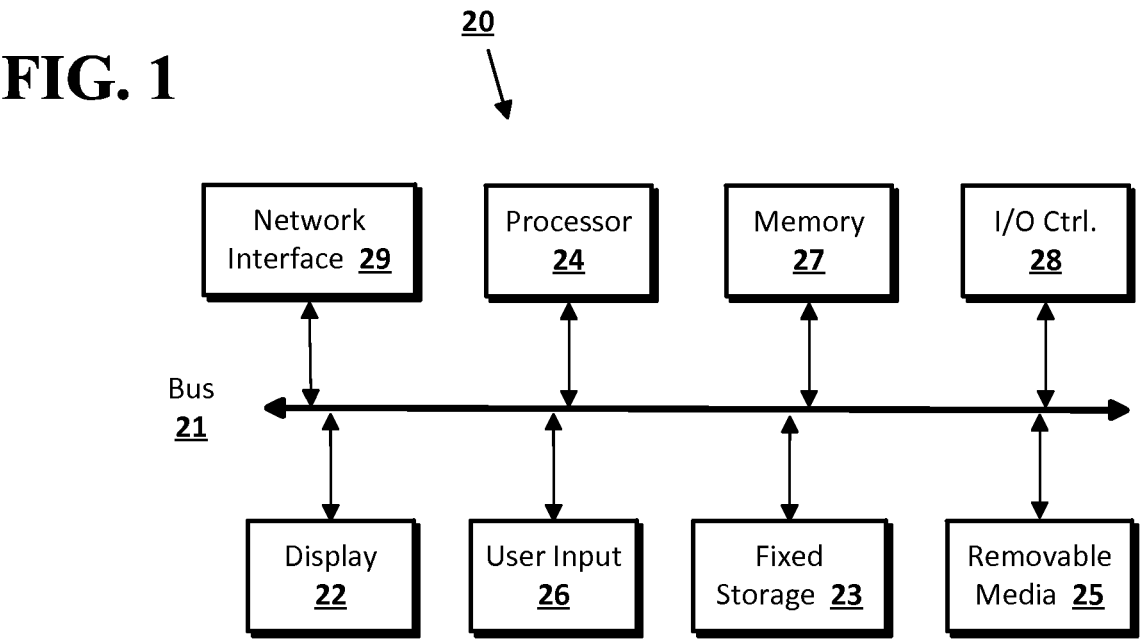
FIG. 1 shows a computer according to an embodiment of the disclosed subject matter.

Although some conventional systems allow for synchronization of a portion of data stored on a device based on, for example, the type of data, here is a need to provide partial synchronization based on user-defined profiles that specify the content to be synchronized under various device usage scenarios. The disclosed subject matter provides this and other capabilities. Generally, techniques and systems for grouping selected digital content into customized profiles for selective synchronization (syncing) of a first computing device with a second computing device are disclosed.

In an embodiment of the disclosed subject matter, a synchronization operation (as performed by, e.g., a computer synchronization software program) is described that allows creation of profiles, identified by labels, that permits associating digital content with the profiles. Profile creation and attachment of content to the profiles may be manually performed by the user. Alternatively, content attachment to profiles may be performed autonomously by the operating system or a software application. If performed autonomously, however, the computer application may respond to an associated identifier (e.g. a tag) attached to the digital content and previously set by a content provider (e.g. a software developer). The profile may be any set of human-readable characters coded in machine-readable form (e.g. ASCII codes) that are supported by the computer operating system of the computing devices being synchronized. The profiles may be contextual such that a profile matches a situation in which the synchronization is expected to occur (e.g. travel), the context may be a type of application (e.g. navigation), or even an arbitrary grouping of data (e.g. personal). A "travel" profile, for example, may be specified for synchronizing a user's device with an in-flight entertainment system during an airplane flight. Example profile labels include "travel", "financial", "airline", "navigation", "sync", "don't sync", "private", "non-private", "personal", and "public". Generally, each profile may correspond to a particular context in which the associated data should or should not by synchronized. For example, data assigned the label "personal" may be synchronized only when the device is provided an opportunity to sync with a system that is not generally accessible by other users, such as a home system of the user, a known-secure system, or the like. Similarly, a "financial" profile may include only financially-sensitive information such as bank accounts, finance management accounts, and the like; such a profile may prevent the associated data from being synchronized unless the device is operating in a secure environment or other context in which the device or the user has an assurance that the data will not be stored where it is accessible to entities not authorized to receive the data, such as a financial institution system, the user's secure home system, or the like.

FIG. 3 outlines an example method of preparing and using a user-defined set of profiles. A synchronization program is initiated step 30 on the computing device. A user-initiated computer instruction, as part of a synchronization program, allows the user to create a profile label step 31 and associate digital content (e.g. software applications, documents, games) with the profile label step 32. The computing devices to be synchronized are connected step 33, and another user-initiated computer instruction allows digital content transfer between the devices step 34 for data specified for the profile label step 35. If the data is associated with the specified profile label, the data is synchronized between the attached devices step 36. If the data is not associated with the profile label, it is not included in the specified profile, and the data is not synchronized between the attached devices step 37. The synchronization program signals the user when the process is complete, allowing the user to disconnect the devices 38. Some profiles allow selective synchronization of data. A "don't sync" profile label associated with a group of files, for example, would signal to the synchronization program that the selected files are to be omitted from a synchronization operation. Another embodiment, for example, may permit internal software application data to be divided into "personal" data and "public" data that can be selectively synchronized with other computing devices.

Grouping digital content together using customized profiles offers enhanced data security and potentially decreases the time required for syncing because only a subset of the entire available content is transferred. For example, n a travel context, a user may want to restrict access to personal financial information by an in-flight entertainment system and do so by creating a "travel" profile and only include user-selected music, video, and travel-related applications within the synchronization profile. At the time of synchronization with the in-flight system, financial data from applications not associated with the selected files will not be transferred. For example, a "Travel" profile might include a mapping or navigation application, a travel management application, a local search and rating application, and an application that provides local entertainment information such as movie show times. When the user's computing device interfaces with the in-flight entertainment system, the user enters the account information, and performs a sync operation. Only the apps and data associated with the selected profile will be synced, ensuring data security for non-selected content. An advantage of this technique is that the time required for the synchronization process to complete is potentially reduced because of the smaller total content size of the subset of files.

In some configurations, the user may not be required to provide account information or to otherwise "log on" to the other system, such as the in-flight entertainment system, while still synchronizing with the system. For example, the mobile device may use a near-field communication (NFC) synchronization process that automatically synchronizes data for an appropriate context when the device is paired to another system. As a specific example, the user may connect his device to the in-flight entertainment system by tapping the device to the in-flight entertainment system, at which point the device may synchronize appropriate data with the in-flight entertainment system as previously described. This may be acceptable to the user because any information that the user would not want synchronized to the potentially-public system may be associated with a profile that prevent synchronization in such a context, and/or because only information that the user finds acceptable to be synchronized to the in-flight entertainment system is associated with the "Travel" profile.

More generally, in an embodiment (e.g. a privacy context), customized profile labels (e.g. "private" and "non-private") may enhance data security. For example, private files (e.g. financial documents) may be backed up during synchronization with a trusted server, but may be omitted during synchronization with an in-flight system or other public or semi-public system. Non-private files (e.g. public domain text files) that may be accessed by anyone without restriction may be synchronized with both the trusted server and the in-flight system.

According to embodiments of the disclosed subject matter, a determination of whether or not to synchronize data may be based upon the context in which a synchronization request is received. For example, after data on a user device has been associated with one or more labels indicating contexts in which the data is or is not to be synchronized, the device may receive a request to synchronize the device with a second device. Either device, but more commonly the user device, may determine a context in which the request is received. For example, continuing the examples above, the user device may determine that the synchronization request is received in a "travel" context based upon one or more factors, such as the location of the device, an identifier provided by the second device, other information stored on the device, and the like. For example, the user device may determine that the request is received in a travel context based upon itinerary information stored in the device, such as by correlating the user's itinerary with the date and time at which the synchronization request is received. As another example, the second device may provide a self-identification, such as identifying the second device as an in-flight entertainment system, which the device recognizes as a "travel" system. As another example, the device may determine that the user is in an airport based upon a position sensor in the device, and subsequently determine that it is likely that the synchronization request is in a "travel" context. As another example, the second system may explicitly provide a context identifier. For example, a financial system may indicate that synchronization requests to or from the financial system are considered in a "financial" or "secure" context. The device may use this indication as the context for a synchronization request that requests the device to synchronize to the financial system. In some configurations, additional verification information may be provided by the financial system or otherwise obtained by the device to verify that the second system is properly identifying a context, or is otherwise trustworthy. For example, the financial system may provide a signed certificate that associates it with a known bank or other financial institution of the user. Based upon a properly-signed certificate, the device may then presume that the context indicated by the system is correct. In some cases, the user may indicate various certificates, entities, or other items that are to be trusted within certain contexts.

Upon determining a context in which a synchronization request is received, a device as disclosed herein may determine that the context is consistent with a context defined by or associated with one or more labels. "Consistent" labels may be those that have the same or similar text, or an overlap in text identifier above a threshold. For example "travel" and "traveling" may be considered as consistent labels. Similarly, a subset of text may be considered as "consistent", such as "private" and "private/personal". Various techniques of determining contextual similarity between labels may be used, such as a preexisting list of labels that are considered equivalent, or a list of groups of labels that are considered equivalent within a group. As another example, a list of labels may be automatically or user-defined during an initial setup phase of an application or component of a user device, after which additional labels may not be added, or after which new labels may be checked for similarity to existing labels and grouped accordingly. Alternatively or in addition, when a new label is added the system may ask the user if the label should be considered an equivalent to any existing labels, or a predefined lookup table of equivalent labels may be used to determine equivalencies automatically. More generally, any suitable technique of determining contextual similarity between identifiers that is known in the art may be used.

In some cases, multiple labels may be applied to the same data, which in some contexts may indicate contradictory synchronization actions. For example, a receipt for airline travel may be labeled both "travel" and "personal". A context identified as "travel" would indicate that the data should be synchronized in the absence of the "personal" label. However, the "personal" label may indicate that the data should not be synchronized, for example if the "travel" label presumes that data will be synchronized to a public or semi-public device. Such conflicts may be addressed in a number of ways. For example, the user may be notified of the conflict and asked to provide final synchronization instructions, either for the specific data or for one or more of the labels applied to the data in question. As another example, the most restrictive label may be used, such that the default is for data not to be synchronized if there is any label applied to the data that would indicate the data should not be synchronized in a particular context. As another example, a set of label overrides may be defined automatically or by a user, which define relationships between labels that indicate whether one label should take precedence over another in various contexts, or in all contexts. In some embodiments, it may be preferred to follow the most restrictive label and/or to prevent synchronization if there is a conflict, so as to prevent unintended synchronization of data and/or unintended disclosure of user data in a context in which a conflict arises.

Contexts also may be considered as "consistent" if they are appropriately associated within a hierarchy of labels and/or contexts. For example, systems as disclosed herein may define, and/or may allow a user to define, hierarchical contexts, such that one context may be a subset or a superset of one or more other contexts. As a specific example, top-level contexts of "public" and "private" may be defined. Other contexts, such as "financial", "family", "office/work", and the like may be defined as sub-contexts of "private". In this example, in a "private" context, all data labeled as "financial", "family", and "office/work" also may be synchronized, while in a "financial" context, only the data labeled as "financial" may be synchronized. Thus, a sub-context may be determined to be "consistent" with its parent context, although a higher-level context may not be determined to be "consistent" with a sub-context, when the synchronization request is received in the sub-context.

Generally, if contexts are not determined to be "consistent" as previously described, they typically will be determined to be not consistent, and associated synchronization may be prohibited, or data labeled with a not-consistent label may be omitted from an existing synchronization operation.

In some embodiments of the presently disclosed subject matter, the data to which labels are assigned may be internal to an application, or it may be stored separately on a device. For example, mobile devices often may store data such as multimedia files separately from any specific application. In addition, each application installed on the mobile device may store data created or accessed by the application in a similar storage location and format. Alternatively or in addition, an application may store data created or accessed by the application internally to the application, or in an application-specific format and/or location within the mobile device. Such application-specific storage may be considered "internal" to the application, because the data may not be generally accessible to other applications, and/or it may not be directly accessible by a user of the device. In embodiments of the disclosed subject matter, context labels may be assigned to internal data and/or to generally-stored data on a device. Thus, for example, a single application may store internal application-specific data that is synchronized in one context and data that is not synchronized in the same context, and/or it may store internal data that is synchronized and/or omitted from synchronization in various contexts. More generally, whether or not data is synchronized in a particular context may be determined entirely based upon the label or labels assigned to the data, without regard to whether the data is internal application data or not.

Embodiments of the presently disclosed subject matter may be implemented in, and used with, a variety of component and network architectures. Any device capable of performing arithmetic operations on data is considered a "computer" or "computing device" for purposes of this disclosure, and may include general or special-purpose computing devices. The terms "computer" and "computing device" are synonymous herein. Example computers include cellular phones, smartphones, tablet computers, personal digital assistants, digital music players, wearable computers, laptop computers, personal computers (PC's), desktop computers, networked servers (e.g. "cloud based" servers), vehicle entertainment systems, global positioning systems, and in-flight entertainment systems. Vehicle entertainment systems, GPS, and in-flight entertainment systems are examples of special-purpose computing devices.

FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
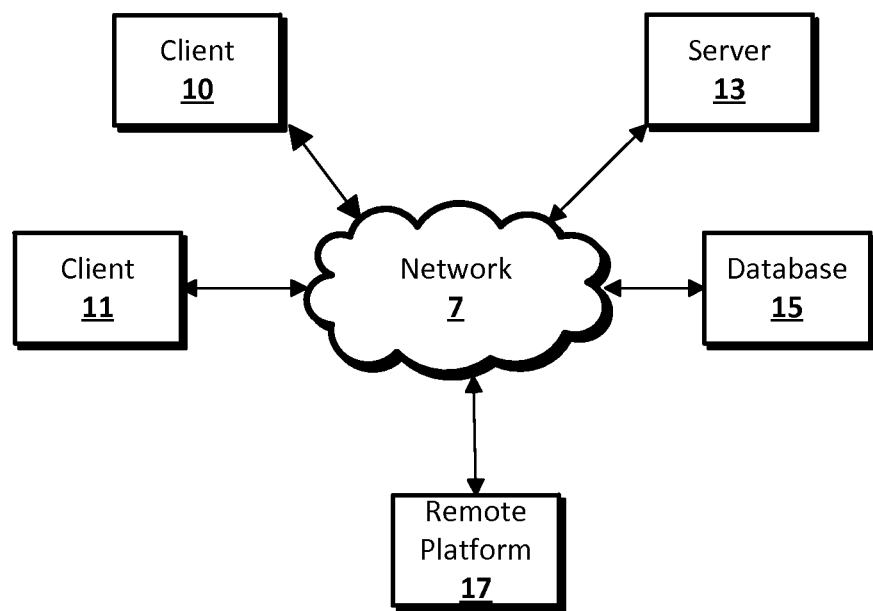
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of synchronizing data between a mobile device and a second device, comprising:

receiving, at the mobile device, input data from a user, the input data indicating a first label to assign to a first portion of data stored on the mobile device, the first label indicating a first context in which the first portion of data is to be synchronized, and a second label to assign to a second portion of data stored on the mobile device, the second label indicating a sub-context of the first context in which the second portion of data is to be synchronized;

receiving a request to synchronize the mobile device with the second device;

determining a second context in which the request is received based on an identification signal transmitted from the second device to the mobile device, the identification signal identifying the second context based on data stored in the second device;

performing a synchronization operation to transfer the first portion of data and the second portion of data from the mobile device to the second device when the second context is consistent with the first context; and performing a synchronization operation to transfer the second portion of data but not the first portion of data from the mobile device to the second device when the second context is consistent with the sub-context.

2. The method of claim 1, further comprising:
receiving, from the user, a second label for a second portion of data stored on the first device, the second label indicating a third context in which the second portion of data is to be synchronized;
determining that the second label prohibits synchronization in the third context;
determining that the second context is consistent with the third context; and
omitting the second portion of data from the synchronization operation.

3. The method of claim 1, further comprising:
receiving, from the user, a second label for a second portion of data stored on the first device, the second label indicating a third context in which the second portion of data is to be synchronized;
determining that the third context is consistent with the first context; and
performing a synchronization operation to synchronize the second portion of data with the second device.

4. The method of claim 1, wherein the first portion of data stored on the first device comprises a software application.

5. The method of claim 1 wherein the first portion of data stored on the first device comprises data internal to a first application installed on the first device.

6. The method of claim 5 wherein the first portion of data stored on the first device comprises data internal to a second application installed on the first device.

7. The method of claim 1, wherein the synchronization operation comprises transferring a copy of the first portion of data from the first device to the second device.

8. The method of claim 1, further comprising providing a user interface to facilitate user interaction with the data synchronization operation.

9. The method of claim 8, further comprising displaying the label, and the portion of data assigned to the label.

10. The method of claim 1, wherein the label is defined by a set of human-readable characters of any length supported by the first device.

11. The method of claim 1, wherein the label comprises at least one selected from the group consisting of "sync", "do not sync", "private", "personal", "public", "non-private", "travel", "financial", and "games".

12. The method of claim 1, wherein a device type of each of the first device and the second device comprises a type selected from the group consisting of: a cellular phone, a smartphone, a tablet computer, a personal digital assistant, a digital music player, a wearable device, a laptop computer, a Personal Computer (PC), a desktop computer, a networked server, a vehicle entertainment system, a global positioning system, and an in-flight entertainment system.

13. The method of claim 1, wherein the synchronization operation comprises establishing a communication between the first device and the second device without providing user account information to the second device.

14. A method of synchronizing data between a first device and a user mobile device, comprising:
establishing, by a first device, a connection with a user mobile device;
transmitting an identification signal from the first device to the user mobile device, the identification signal identifying a context in which the first device is operable to connect to the user mobile device;
identifying, automatically, data on the user mobile device based on an identifier attached to a first portion of data by a content provider of the data and a second identifier attached to a second portion of data by a user of the user mobile device, the identifier being associated with a first label that is consistent with the context in which the first device is operable to connect to the user mobile device and the second identifier being associated with a second label that is a sub-context of the context; and
receiving the identified data from the user mobile device in a synchronization operation.

15. The method of claim 14 wherein the first portion of data stored on the first device comprises data internal to a first application installed on the first device.

16. The method of claim 15 wherein the first portion of data stored on the first device comprises data internal to a second application installed on the first device.

17. The method of claim 14, further comprising:
providing verification data to the user mobile device, the verification data providing verification that the first device is a trustworthy source for identifying the context.

18. The method of claim 17, wherein the verification data comprises a digital signed certificate.

19. The method of claim 1, wherein consistency between contexts is determined based upon at least one selected from the group consisting of: a similarity in label text, an overlap in label text above a threshold, a preexisting list of labels that are considered equivalent, or a list of groups of labels that are considered equivalent within a group.

* * * * *